May 26, 1953  R. A. SWINAMER  2,639,934
WHEEL LIFTER
Filed Oct. 23, 1950
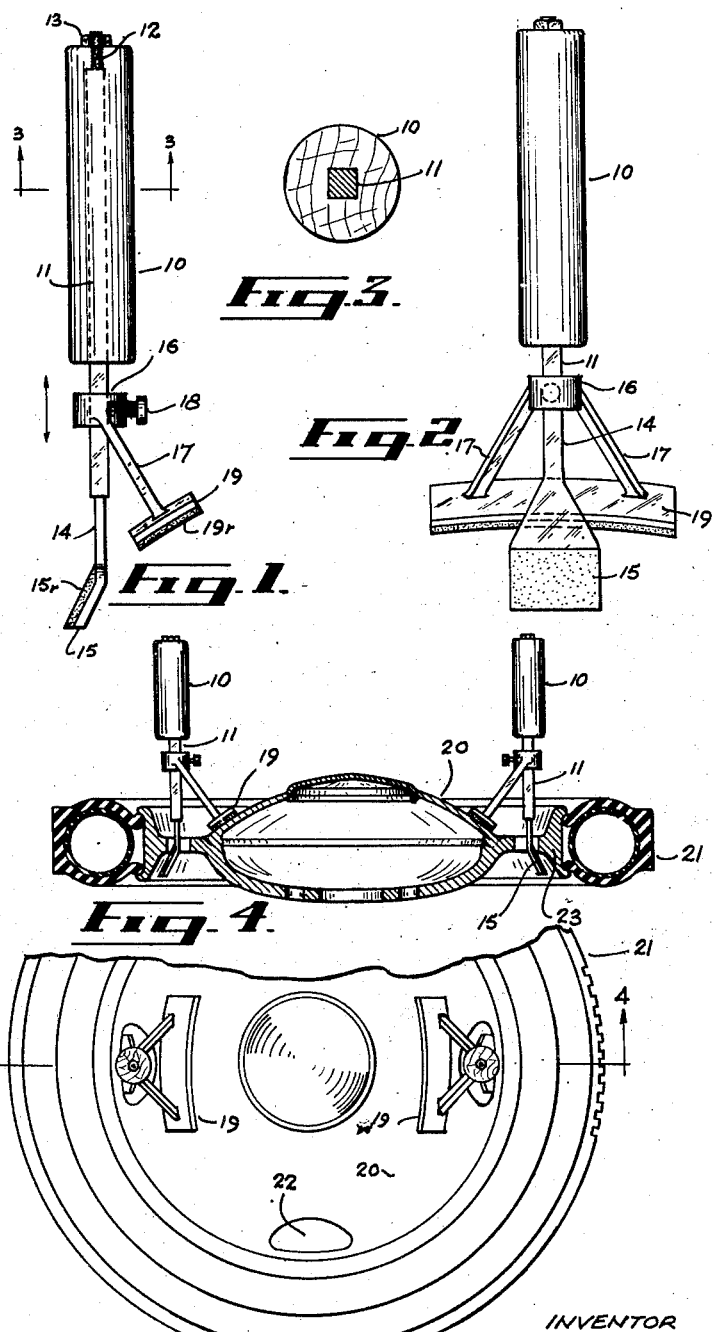
INVENTOR
R.A. SWINAMER
BY Bailey, Stephens & Huettig
ATTORNEYS Patented May 26, 1953

2,639,934

UNITED STATES PATENT OFFICE 2,639,934

WHEEL LIFTER

Robert Almer Swinamer, Armdale, Nova Scotia, Canada, assignor of one-half to Arthur H. Phillips, Halifax County, Nova Scotia, Canada Application October 23, 1950, Serial No. 191,528
In Canada October 6, 1950

4 Claims. (Cl. 294—15)

This invention relates to a device for removing or fitting the wheels of cars and in particular to a device for removing the wheel from the car axle after a puncture has taken place and fitting thereon the spare wheel.

Heretofore when a puncture or blow-out has been encountered while driving a car it has been necessary after removing the nuts holding the wheel to the axle, to remove the wheel from the axle manually, then to fit the spare onto the axle. Since quite frequently the driver and other members of the car are immaculately dressed at the time the puncture or blow-out occurs, the manual handling of the wheels stains and soils their clothes, causing great inconvenience.

This invention proposes to provide a tool for handling the wheels during wheel changing, by which the soiling and staining is avoided.

The tool which accomplishes this and which embodies this invention comprises a curved blade member adapted to be inserted into the air vent slot which may be described as an oblong slot situated adjacent to the periphery of the disc of a disc type wheel and thereafter to fit against the opposing surface of the wheel adjoining the slot, a flat buffer member adapted to bear on the disc portion of the wheel and a handle from which the above two members project. The blade member is rigidly attached to the handle and the buffer member is movable relative to the handle and blade. The tool is used by inserting the blade in the air vent slot, adjusting the buffer until it fits against the disc of the wheel and until the tool is firmly clamped to the wheel. A second tool of the same sort is inserted in an air vent slot preferably diametrically opposite the first and similarly clamped. Then by grasping the respective handles the wheel may be lifted from the axle and may then be rolled to the rear of the car. By a similar process the tools are clamped to the spare wheel and it is fitted on the axle. It is thus seen that great convenience is added to the necessary job of tire changing by the use of this tool since manual handling is avoided.

In order that the invention may be more clearly understood reference may be had to the attached drawings in which:

Figure 1 shows a side elevation of a tool which is the subject of this invention.

Figure 2 shows a front elevation of the same tool.

Figure 3 shows a cross section of a part of the tool.

Figure 4 is a partial cross section which shows two of the tools in position to lift a car wheel.

Figure 5 shows a plan view of a car wheel with which this invention may be used.

As will be seen from the drawings a rounded handle 10 is rectangularly bored to receive a rectangular steel rod 11 therein. The steel rod is rounded at its upper end and has its surface 12 threaded to receive an attaching nut 13 which is seated at the upper end of the handle 10 and attaches the rod firmly to the handle. The rod projects some distance below the handle and extending from the lower end of the rod is a blade shank 14 having at the lower extremity a blade 15. The blade 15 is curved outwardly near its lower extremity and is of a convenient width to be received in the air vent slot of a wheel and of a convenient curvature to engage the wheel rim. Attached to the lower portion of the handle is a buffer support 16 which is also bored to allow the passage of the rod 11 therethrough and having therein a clamping screw 18 adapted to engage the rod 11. The buffer support 16 is adapted to slide vertically on the rod 11 and to be clamped in position thereon by the clamping screw 18.

Extending downwardly and outwardly from the buffer support are two similar supporting arms 17 which are rigidly attached to each end of a buffer plate 19. The buffer plate is attached at such an angle and has such a curvature as to engage with its lower surface, the disc 20 of a car wheel 21. It will be seen that the curvature of blade 15 and plate 19 are related to each other and to the shape of the car wheel with which they are to be used and in some cases it will be necessary to have various tool models to use with various makes of cars.

For better service and for protection to the members and the car wheel, the wheel engaging portions of the blade and buffer plate may be rubber surfaced as at 15r and 19r.

The operation and use of the invention will now be described. When a puncture occurs: the car is stopped, the wheel jacked up and the wheel-retaining nuts removed. It is then necessary to remove the wheel from the axle. For this, two of the above-described tools are used. In each the clamping screw 18 is loosened so that the buffer support 16 may slide easily on the rod 11. The blade of the tools is inserted into an air vent slot 22 and the curved blade is fitted against the rim 23 of the wheel 20. The buffer support 16 is then slid along rod 11 until the buffer plate bears firmly against the disc 20 of the wheel. The clamping screw 18 is then tightened so that the buffer support 16 is fixed on the rod 11 and the blade 15 and buffer plate 19 are fixed in relation to one another. The tool is now firmly clamped to the wheel. A diametrically opposed air vent slot is selected and a similar procedure carried out whereby the second tool is attached. These two tools being fixed in place, a handle 10 is grasped in each hand of an occupant or a handle is grasped by each of two occupants of the car and the wheel lifted down to the ground. The tools are then adjusted to the spare wheel and the spare wheel lifted onto the naked axle and fitted thereon. The nuts are then replaced and the spare wheel bolted in place. When a tool has been adjusted for a particular wheel, it can be used to grip that wheel and can be removed from that wheel without further adjustment of clamping screw 18. When the handle 10 is swung outwardly of the wheel, the blade 15 can be withdrawn through the air vent slot.

The invention thus overcomes one of the great inconveniences of tire changing by allowing the wheels to be removed and fitted without manual handling.

I claim:

1. In a device for handling an automobile wheel of the disc type having oppositely disposed slots at the periphery of the disc a pair of tools each of which comprises a handle, an elongated member extending from said handle, a blade angularly extending downwardly in one direction from the end of said member which is opposite from said handle and adapted to be passed through a slot and to bear against the opposing surface adjoining the slot, a second elongated member extending from the first elongated member downwardly in a direction at an angle to said direction and terminating in a buffer member with a concave arcuate surface shaped to conform to and bear on the facing surface of the wheel disc adjacent to the slot.

2. In a device as in claim 1, means for adjusting the relative positions of the blade and buffer member comprising slidably securing the second elongated member to the first elongated member and providing means for fastening the second elongated member at any position along the first elongated member.

3. A device as in claim 1 in which the bearing surface of the buffer member extends a substantial distance laterally of the tool along the surface of the wheel disc.

4. In a device for handling an automobile wheel of the disc type having oppositely disposed slots at the periphery of the disc, a pair of tools each of which comprises a handle, a shank extending in alignment with said handle, a blade angularly extending downwardly in one direction from the end of said shank which is opposite to said handle and adapted to be passed through a slot, a resilient surface on the surface of the blade facing in said one direction to bear against the opposing surface of the wheel adjoining the slot, a buffer support clamped to the handle, diverging arms angularly extending from said buffer support downwardly in a direction at an angle to said direction, a buffer member rigidly connected to the spaced ends of the said arms, said buffer member being substantially at right angles to said arms and having a concave arcuate surface shaped to conform to the facing surface of the wheel disc adjoining to the slot, a resilient surface on the surface of the buffer member which bears on the wheel disc.

ROBERT ALMER SWINAMER.

References Cited in the file of this patent

UNITED STATES PATENTS

| Number | Name | Date |
|---|---|---|
| 867,080 | Rife | Sept. 24, 1907 |
| 960,070 | Brown | May 31, 1910 |
| 1,794,471 | Moore | Mar. 3, 1931 |
| 1,879,532 | Schlebecker | Sept. 27, 1932 |
| 2,541,863 | Deans et al. | Feb. 13, 1951 |

FOREIGN PATENTS

| Number | Country | Date |
|---|---|---|
| 619,407 | Germany | Sept. 30, 1935 |